(12) United States Patent
Hurst et al.

(10) Patent No.: US 8,122,581 B1
(45) Date of Patent: Feb. 28, 2012

(54) BAR MOUNTED TOOL ADAPTOR

(75) Inventors: Rick Hurst, Rochester Hills, MI (US);
Corey Chappus, Armada, MI (US);
Bryan Voss, Warren, MI (US)

(73) Assignee: Syron Engineering & Manufacturing, LLC, Saline, MI (US)

( * ) Notice: Subject to any disclaimer, the term of this patent is extended or adjusted under 35 U.S.C. 154(b) by 32 days.

(21) Appl. No.: 12/822,369

(22) Filed: Jun. 24, 2010

Related U.S. Application Data

(62) Division of application No. 11/248,074, filed on Oct. 12, 2005, now Pat. No. 7,748,107.

(60) Provisional application No. 60/617,969, filed on Oct. 12, 2004.

(51) Int. Cl.
*B23P 21/00* (2006.01)
(52) U.S. Cl. .......................................................... 29/469
(58) Field of Classification Search .................... 29/469, 29/559, 721, 700, 281.1, 281.4, 281.5, 281.6, 29/283, 743; 414/752.1, 749, 749.1, 751.1; 294/65
See application file for complete search history.

(56) References Cited

U.S. PATENT DOCUMENTS

| | | | |
|---|---|---|---|
| 5,733,097 A | 3/1998 | Herbermann et al. | |
| 5,746,567 A | 5/1998 | Herbermann et al. | |
| 5,909,998 A | 6/1999 | Herbermann et al. | |
| 6,190,395 B1 | 2/2001 | Williams | |
| 6,244,814 B1 | 6/2001 | Herbermann et al. | |

*Primary Examiner* — John C Hong
(74) *Attorney, Agent, or Firm* — Young Basile Hanlon & MacFarlane P.C.

(57) ABSTRACT

A method for mounting a plurality of tool rails of a tool mounting system according to a desired orientation. The method includes mounting a plurality of tool rail supports to a base, wherein each of the plurality of tool rail support has a releasable mount and a lug mount. Each of the plurality of tool rails is assembled to include a mount plug receivable within the releasable mount of the tool rail supports, and a lug receivable within the lug mount of the tool rail supports. At least one of the plurality of tool rail supports is fixed with the releasable mount spaced apart from the lug mount such that only a desired one of the plurality of tool rails can be received in a corresponding one of the tool rail supports.

18 Claims, 3 Drawing Sheets

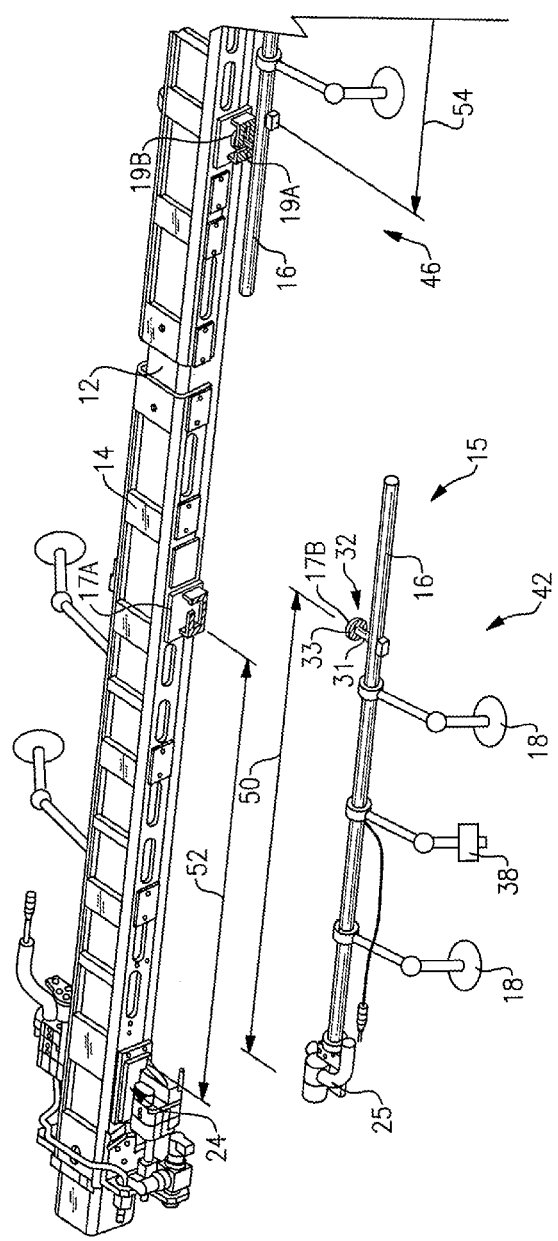

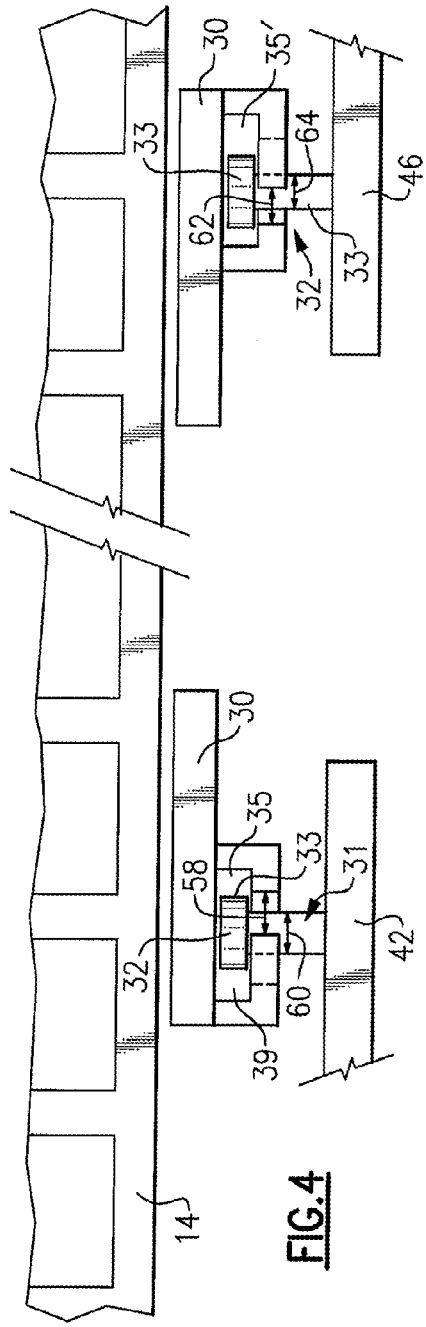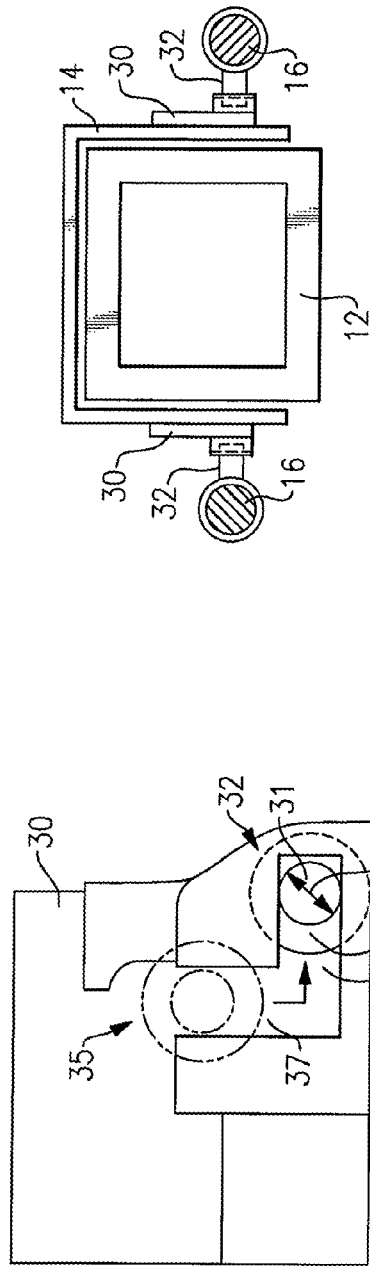

BAR MOUNTED TOOL ADAPTOR

REFERENCE TO RELATED APPLICATIONS

The application is a divisional application of U.S. patent application Ser. No. 11/248,074, which issued as U.S. Pat. No. 7,748,107 and which claims priority of U.S. Provisional Application No. 60/617,969.

BACKGROUND OF THE INVENTION

This invention generally relates to a tool mounting system for a workpiece transfer system. More particularly, this invention relates to a tool mounting system mountable to a workpiece transfer system.

A workpiece transfer system includes a bar that moves a workpiece between desired locations. Often the workpiece transfer system will move body panels between stamping stations. Tools such as grippers or vacuum cups are attached to the bar and grasp a workpiece at one location and release the workpiece at another location. The tools often utilize pressurized air for actuation and therefore need numerous pneumatic couplings and conduits that are attached to the bar.

In many applications of workpiece transfer systems, the clearance between the bar and the stamping station is limited. Accordingly, each part must fit within certain defined space restrictions. This includes the pneumatic and electrical wires that supply and control actuation of the gripper and vacuum tools.

Further, it is often the case with many transfer systems that multiple workpiece configurations are fabricated within the same line. The stamping dies are changed over along with the tooling required to move the workpieces between stations. Rigidly attached tooling makes change over difficult and time consuming.

Accordingly, it is desirable to design a transfer system that provides for switching of tooling while remaining within the space limitations of the transfer system.

SUMMARY OF THE INVENTION

The present invention provides a method of mounting a plurality of tool rails of a tool mounting system according to a desired orientation, wherein the steps of the invention include mounting a plurality of tool rail supports to a base, wherein each of the plurality of tool rail supports has a releasable mount and a lug mount. The method further includes assembling each of the plurality of tool rails to include a mount plug receivable within the releasable mount of the tool rail supports, and a lug receivable within the lug mount of the tool rail supports. The method further includes fixing at least one of the plurality of tool rail supports with the releasable mount spaced apart from the lug mount such that only a desired one of the plurality of tool rails can be received in a corresponding one of the plurality of tool supports.

The method further includes fixing at least one of the plurality of tool rail supports with a support feature different than at least one other of the plurality of tool rail supports comprised of fixing a first axial distance between the releasable mount and the lug mount and fixing the axial distance between the mount plug and the lug of a corresponding one of the plurality of tool rails to correspond with the first axial distance.

The method may also include fixing an axial distance between the releasable mount and the lug mount for at least one of the plurality of tool rail supports different than the axial distance of another of the plurality of tool rail supports and providing only the at least one of the plurality of tool rails with a corresponding axial distance for each of the tool rail supports such that each of the plurality of tool rails can be mounted only to a corresponding one of the plurality of tool rail supports.

Each of the lugs may be provided with a first dimension corresponding with the lug mount and providing each of the plurality of tool rail supports with a different first dimension, such that only one of the plurality of tool rails is supportable within a corresponding one of the plurality of tool rail supports. The lug may be further provided with a shaft receivable within the lug mount, wherein the first dimension comprises a diameter of the shaft corresponding to a width in the lug mount.

Shading may also be provided on each corresponding lug and lug mount of each plurality of tool rail support and tool rails with a common color to ensure for proper assembling of said tool mounting system.

These and other features of the present invention can be best understood from the following specification and drawings, the following of which is a brief description.

BRIEF DESCRIPTION OF THE DRAWINGS

FIG. 2 is another perspective view of the example bar tool mounting system with a rail removed.

FIG. 3 is a schematic view of an example lug mount according to this invention.

FIG. 4 is a top schematic view of example drop down lug mounts according to this invention.

FIG. 5 is a cross-sectional view of the example tool mounting system.

DETAILED DESCRIPTION OF THE PREFERRED EMBODIMENT

Figure 1:
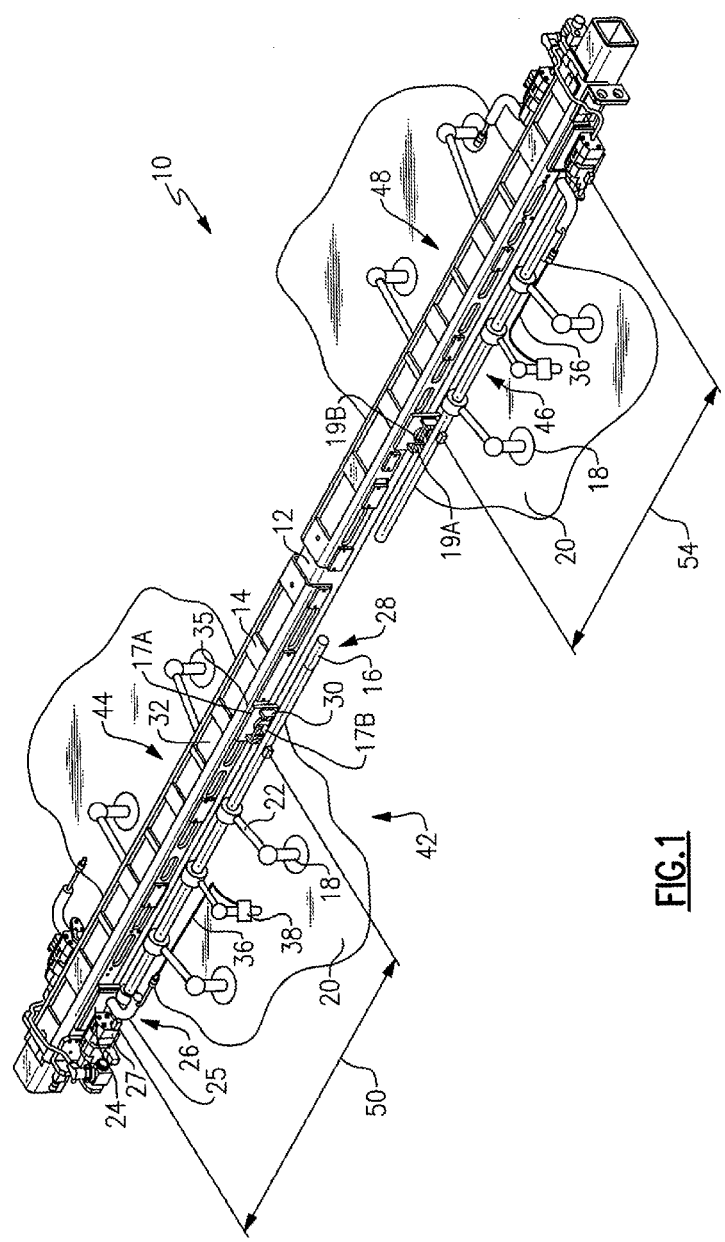
FIG. 1 is a perspective view of an example bar tool mounting system according to this invention.

Referring to FIG. 1, workpiece transfer system 10 includes a bar 12 that moves a workpiece 20 between workstations (not shown). An adaptor 14 is attached to the bar 12 and supports the tools 18. The tools 18 extend from removable rails 16 attached to the adaptor 14. The tools 18 illustrated are pneumatically actuated suction cups. However, other tools as are known would also benefit from the disclosures of this invention, for example, mechanical grippers and part present sending devices.

The rail 16 is part of a rail assembly. There are four rail assemblies 42, 44, 46 and 48 illustrated. The tools 18 are mounted to arms 22 that are in turn mounted to the rail 16 of each rail assembly 42, 44, 46 and 48. The position of the tools 18 along the rail 16 is infinitely adjustable such that the configuration and placement of the tools 18 can be tailored to the requirements of a specific application and workpiece 20.

Each of the rail assemblies 42, 44, 46 and 48 include a mount plug 25 that is attachable to a selectively releasable mount connector 24 attached to the adaptor 14. The mount plug 25 is affixed to a first end of the rail 16 for each of the rail assemblies 42, 44, 46 and 48. The mount plug 25 interfaces with the mount connector 24 to communicate pressurized air and provide an electrical connection for any electrical devices mounted to the rail 16. The mount connector 24 includes a locking device 27 movable between a released position where the rail 16 may be removed and a secured position where the rail 16 is rigidly held into the mount connector 24, and the desired electrical and pneumatic connections are completed.

The example rail assembly 42 includes a sensor 38 for detecting the presence of the workpiece 20. The sensor 38 is electrically attached through the interface between the mount plug 25 and the mount connector 24. The mount connector 24 is in turn in communication with a source of electrical energy and pressurized air. Further, the mount connector 24 is adaptable for providing communication of control signals to the tools 18 mounted to the rail 16.

The mount connector 24 also provides support of an end of the rail 16. The second end 28 of the rail 16 is supported by a lug 32 that fits within a lug mount 30. The lug 32 on the rail 16 is first placed within the lug mount 30 and slid axially into full engagement with the mount connector 24. The lug mount 30 receives the lug 32 within a slot 35 that includes a vertical portion 37 and horizontal portion 39. The lug 32 drops within the vertical portion 37 of the slot 35 and is slid axially within the horizontal portion 39 of the slot to facilitate axial engagement and securement of the mount plug 25 within the mount connector 24. Although a mount connector 24 and mount plug 25 are illustrated, it is within the contemplation of this invention to utilize other mounting devices that are known in the art.

The rail assemblies 42, 44, 46 and 48 are installed to the adaptor 14 in a specific location. Each of the rail assemblies 42, 44, 46 and 48 are adapted to fit only one location to ensure a desired orientation of the rail assemblies 42, 44, 46 and 48 to comply with application specific requirements. Each of the rail assemblies 42, 44, 46 and 48 are identified by a color code. The color of the lug 32 corresponds to a color on the lug mount 30 to provide a determination of the correct position for mounting of the rail assembly.

The color code in the illustrated example is green for the rail assembly 42 and is indicated schematically by shading 17B on the rail assembly 42 and shading 17A on the lug mount 30. The rail assembly 46 includes a gold color code schematically indicated at 19A on the rail 16 and a matching gold color indicated at 19B on the lug mount 30. The rail assembly 44 includes a silver color code (not shown), and the rail assembly 46 includes a black color code (not shown). The color codes 17A and 19A disposed on the rail 16 of each rail assembly 42, 46 comprise a colored tape. The color codes 17B and 19B on the lug mounts 30 are provided by a desired plating color. As appreciated, other colors and methods of adhering that color to the lug mount and the rail may be utilized to identify each position on the adaptor 14 with the corresponding one of the rail assemblies 42, 44, 46 and 48. The different color codes provide for easy identification of the proper location for the rail assembly.

Referring to FIG. 2, the rail assembly 42 is illustrated removed from the rail adaptor 14. The rail assembly 42, like the other rail assemblies 44, 46 and 48, includes a length 50 between the lug 32 and a portion of the mount plug 25. The length 50 for each of the rail assemblies is unique such that one rail assembly cannot be assembled into the place of another rail assembly. In the example illustrated in FIG. 2, the rail assembly 46 includes a length 54 that is different than the length 50 such that the rail assembly 46 cannot be assembled in place of the rail assembly 42. The length 50 between the lug 32 and the end of the mount plug 25 corresponds to a length 52 between the mount connector 24 and the lug mount 30. The length 52 is measured from a stop of the mount connector 24 and a position within the horizontal portion 39 of the slot 35 within the lug mount 30.

The length 50 between the lug 32 and the end of the mount plug 25 is a dimension that is fabricated within desired tolerances to provide the desired fit once mounted. As appreciated, some prior art tool mounting devices include multiple critical dimensions that must be closely controlled to provide the desired fit or event to allow assembly. The instant tool mounting system includes only a single closely held dimension, thereby simplifying assembly and fabrication.

The rail assembly 42 is easily removable by unlocking the mount plug 25 from the mount connector 24 and moving the entire rail axially away from the mount plug 25 until the lug 32 is free to move vertically within the slot 35 of the lug mount 30. Another rail assembly including tooling for a differently shaped and configured workpiece can then be installed to provide a relatively quick and easy tooling change over.

In operation, several sets of rail assemblies will be provided that correspond to various and differently configured workpieces. Change over is conducted by removing one set of color-coded rail assemblies and installing another set in the proper color code locations. Rail assemblies can only be properly installed into corresponding locations due to the different lengths 50 and 54 between the mount connector 24 and the lug mount 30.

Referring to FIG. 3, the lug mount 30 is shown without the rail and adaptor for clarity. The lug mount 30 includes the slot 35 having the vertical portion 37 and the horizontal portion 39. The drop down feature provided by the lug 32 being received in the slot 35 facilitates quick assembly of a rail assembly. The lug 32 includes a bushing 33 that supports the tool and prevents twisting during installation. The drop down feature thereby prevents twisting of the rail assembly during assembly, thereby substantially eliminating the need for an assembler to support the rail assembly during the entire assembly process.

Referring to FIG. 4, the lug mount 30 is shown schematically that correspond to mounting arrangements for the rail assembly 42 and the rail assembly 46. The slot 35 includes a width 58 for the lug 32. The lug 32 includes the bushing 33 supported on a shaft 31. The shaft 31 includes a diameter 60 that corresponds with the width 58 that provides for assembly of the lug 32 within the slot 35. The width 58 is tailored to each of the rail assemblies 42, 44, 46 and 48 such that each of the rail assemblies 42, 44, 46 and 48 includes a tailored width 58 unique to that particular rail assembly.

Accordingly, the rail assembly 46 is partially shown with the lug 32 having a shaft 31 of a diameter 64 different than the diameter 60 for the rail assembly 42. the lug mount 30 for the rail assembly 46 includes a width 62 of the slot 35' that prevents another rail assembly, such as for example the rail assembly 42 from being installed within the lug mount 30 instead of the rail assembly 46. Accordingly, the different diameters for each shaft 31 of each of the rail assemblies 42, 44, 46 and 48 substantially prevent assembly of a rail assembly in a non-desired orientation.

Referring to FIG. 5, a cross-section of the transfer system 10 is shown with the adaptor 14 attached to the bar 12. As appreciated, the transfer system 10 operates within a space-restricted environment. In some applications, it is desired to limit or eliminate mounting of devices or objects to the top of the bar 12. Such applications may not allow the mounting of electrical wire harnesses and airlines to the top surface of the bar 12. In such applications, the instant adaptor 14 provides the necessary mounting and communication of air and electric to the tooling without extending substantially beyond the top surface of the bar 12. The addition of the adaptor 14 adds only the minimal thickness of the adaptor 14 to the overall height of the bar 12.

Accordingly, the inventive workpiece transfer system 10 includes several features that assure proper configuration of the several rail assemblies 42, 44, 46 and 48 that expedite and facilitate quick tool changeover. Different lengths between mounting points for each rail assembly and tailored diameters of shafts for each lug accompanied by color-coded parts provides for fail safe and efficient tool change over. Further, the drop down mounting provided by the lug and lug mount tool mount configuration eases mounting by eliminating awkward and difficult maneuvering of the rail assemblies during the mounting process.

Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method of mounting a plurality of tool rails of a tool mounting system according to a desired orientation comprising the steps of:
   a) mounting a plurality of tool rail supports to a base, wherein each of said plurality of tool rail supports has a releasable mount and a lug mount;
   b) assembling each of the plurality of tool rails to include a mount plug receivable within the releasable mount of the tool rail supports and a lug receivable within the lug mount of the tool rail supports; and
   c) fixing at least one of the plurality of tool rail supports with the releasable mount spaced apart from the lug mount such that only a desired one of the plurality of tool rails can be received in a corresponding one of the plurality of tool rail supports.

2. The method as recited in claim 1, further comprising the steps of:
   fixing at least one of the plurality of tool rail supports with a support feature different than at least one other of the plurality of tool rail supports comprises fixing a first axial distance between the releasable mount and the lug mount and fixing the axial distance between the mount plug and the lug of a corresponding one of the plurality of tool rails to correspond with the first axial distance.

3. The method as recited in claim 1, further comprising the steps of:
   fixing an axial distance between the releasable mount and the lug mount for at least one of the plurality of tool rail supports different than the axial distance of another of the plurality of tool rail supports, and providing only the at least one of the plurality of tool rails with a corresponding axial distance for each of the tool rail supports such that each of the plurality of tool rails can be mounted only to a corresponding one of the plurality of tool rail supports.

4. The method as recited in claim 1, further comprising the steps of:
   providing each of the lugs with a first dimension corresponding with the lug mount, and providing each of the plurality of tool rail supports with a different first dimension such that only one of the plurality of tool rails is supportable within a corresponding one of the plurality of tool rail supports.

5. The method as recited in claim 4, further comprising the steps of:
   providing the lug with a shaft receivable within the lug mount, wherein the first dimension comprises a diameter of the shaft corresponding to a width in the lug mount.

6. The method as recited in claim 1, further comprising the steps of:
   shading each corresponding lug and lug mount of each plurality of tool rail support and tool rails with a common color to ensure for proper assembling of said tool mounting system.

7. A method of releasably mounting at least one tool rail to a base of a workpiece transfer system comprising the steps of:
   providing at least one mount connector on said base releasably connectable to a corresponding mount plug on one of said at least one tool rails; and
   providing at least one lug mount on said base releasably connectable to a corresponding lug on one of said at least one tool rails.

8. The method as recited in claim 7, further comprising the steps of:
   mounting corresponding said at least one mount connector and said at least one lug mount a predetermined axial distance from one another along said base so that only a desired one of said at least one tool rail is properly connected to said base.

9. The method as recited in claim 8, further comprising the steps of:
   providing different predetermined axial distances between corresponding said at least one mount connectors and said at least one lug mounts such that only a desired one of the at least one tool rail can be received in corresponding releasable mounts and lug mounts on said base.

10. The method as recited in claim 7, further comprising the steps of:
    providing said at least one lug mount releasably connectable to said lug of said at least one tool rail, and said at least one lug mount having a slot with a predetermined width correspondingly adaptable to a width of said lug to ensure proper mounting of said at least one tool rail to said base.

11. The method as recited in claim 7, further comprising the steps of:
    shading said at least one lug mount with a color that correspondingly matches a color on said at least one tool rail to ensure proper mounting of said at least one tool rail to said base.

12. A method of releasably mounting at least one tool rail to a base of a workpiece transfer system, further comprising the steps of:
    providing said at least one tool rail with a mount plug releasably engageable with a mount connector on said base; and
    providing said at least one tool rail with a lug releasably engageable with a lug mount on said base for releasably mounting said at least one tool rail on said base.

13. The method as recited in claim 12, further comprising the steps of:
    mounting said mount plug and said lug at different predetermined axial distances on each of said at least one tool rails so that only a desired one of said at least one tool rail is properly connected to said base.

14. The method as recited in claim 12, further comprising the steps of:
    providing said lug of each of said at least one tool rail with a different predetermined dimension that is correspondingly engageable with a slot on said lug mount having a predetermined width so that only a desired one of said at least one tool rail is properly connected to said base.

15. The method as recited in claim 12, further comprising the steps of:

shading said lug of said at least one tool rail with colors that correspondingly match with colors on a tool mount of said base to ensure for proper mounting of said at least one tool rail to said base.

16. A method of assuring a desired assembly of a plurality of tools for a part transfer system comprising the steps of:
  a) spacing a first releasable mount from a first lug mount a first distance;
  b) spacing a second releasable mount from a second lug mount a second distance different than the first distance;
  c) spacing a mount plug from a lug on a first tool rail the first distance such that the mount plug is receivable within the first releasable mount and the lug is receivable within the first lug mount; and
  d) spacing a mount plug from a lug on a second tool rail the second distance such that the mount plug is receivable within the second releasable mount and the lug is receivable within the second lug mount.

17. The method as recited in claim 16, wherein the first lug mount includes an opening having a first width and the second lug mount includes an opening having a second width different than the first width, and the lug on the first rail includes a lug corresponding to the first width and the lug on the second rail includes a lug corresponding to the second width.

18. The method as recited in claim 17, including the step of mounting the first and second releasable mounts and the first and second lug mounts to an adaptor supported on a base.

* * * * *